Oct. 30, 1934.  F. A. SHORT  1,978,725
HOUSED SPRING FOR HINGE CONNECTIONS OF EYEGLASS FRAMES
Filed Sept. 7, 1932
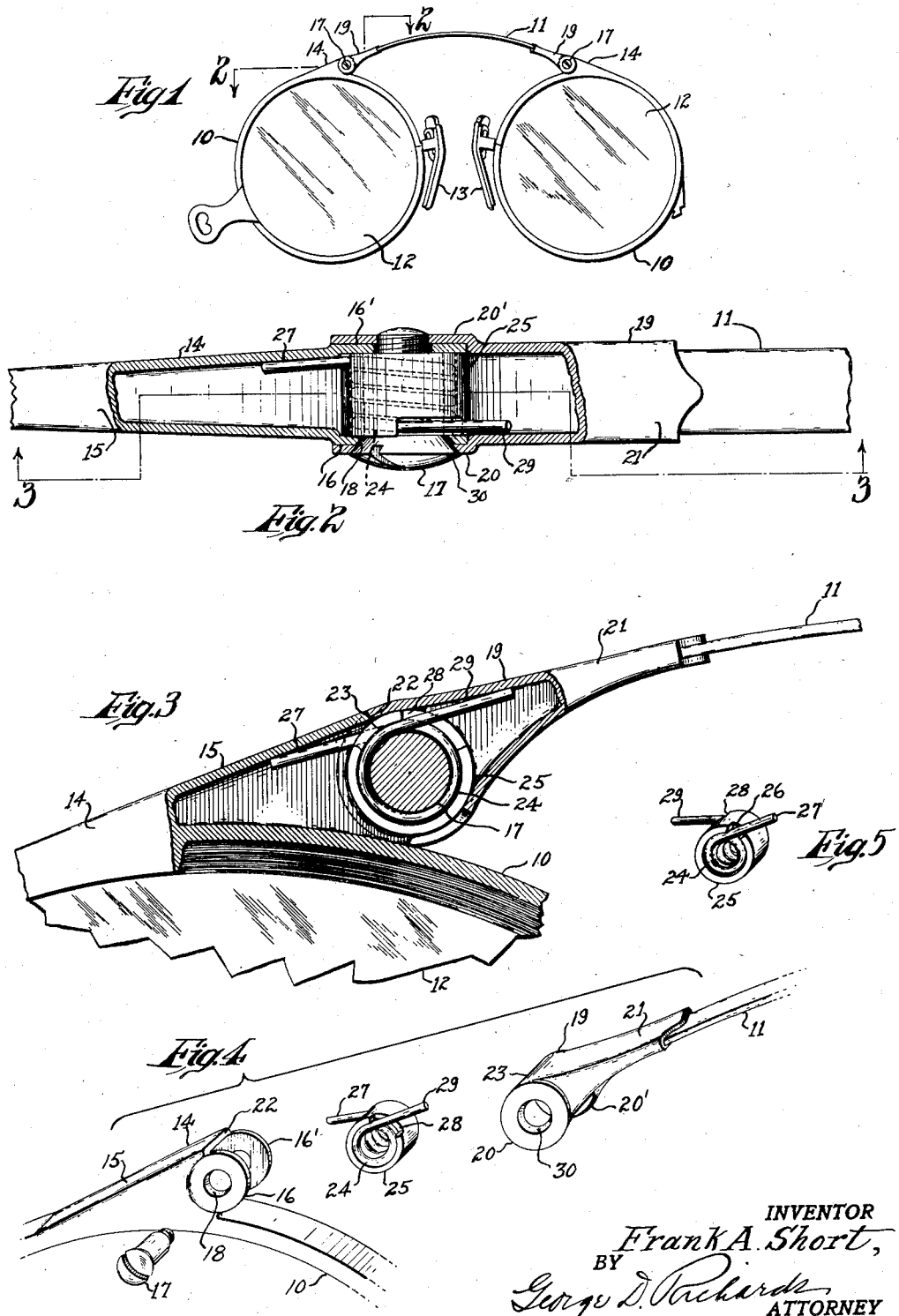
INVENTOR
Frank A. Short,
BY
George D. Richards
ATTORNEY Patented Oct. 30, 1934

1,978,725

UNITED STATES PATENT OFFICE 1,978,725

HOUSED SPRING FOR HINGE CONNECTIONS OF EYEGLASS FRAMES

Frank A. Short, Hillside, N. J., assignor to T & P Optical Mfg. Co., Inc., New York, N. Y., a corporation of New York Application September 7, 1932, Serial No. 631,974

3 Claims. (Cl. 88—44)

This invention relates, generally, to a novel housed spring for use in various hinge connections employed in eye-glass frames, as, for example, in the hinge joints connecting the spring bridge to rims in Oxfords, lorgnettes and other types of folding frames, or in hinge joints connecting temples to rims of spectacle frames, or for any other purpose wherein a spring hinge connection is desired.

In the use of spring hinge connections as heretofore employed, it has been generally necessary to assemble the hinge elements and cooperating spring at the factory, and in the event that either the coil spring or hinge elements should subsequently become broken or defective in use, it has usually been necessary to return the frames to the factory for repair, inasmuch as such work required special assembling tools and equipment.

The principal object of the present invention is to provide a novel form of housed spring for hinge joints, in which the spring is maintained by its housing under initial tension, and its arms so disposed as to permit of easy and quick assembly in cooperative relation to hinge elements to be served thereby, whereby replacement thereof may be easily and quickly made by any retail jeweler or optician without necessity for use of special tool or assembling equipment.

Other objects of this invention, not at this time more particularly enumerated, will be understood from the following detailed description of the same.

An illustrative embodiment of this invention is shown in the accompanying drawing, wherein the novel housed spring is shown, by way of one example of its use, in connection with the hinge connection employed to join a spring bridge to a lens rim in a folding eye-glass frame of the Oxford type. In said drawing:

Fig. 1 is an outer face view of an eye-glass frame of the folding Oxford type having bridge hinge joints utilizing the novel housed spring according to this invention; Fig. 2 is an enlarged fragmentary sectional view, taken substantially along line 2—2 in Fig. 1; Fig. 3 is a part sectional view taken substantially along line 3—3 in Fig. 2; Fig. 4 is a perspective view of the several parts of the spring hinge connection disassembled; and Fig. 5 is a perspective view of the novel housed spring viewed from the opposite end relative to the point of view of the same as shown in Fig. 4.

Similar characters of reference are employed in all of the above described views, to indicate corresponding parts.

Referring now to the said drawing, the reference numeral 10 designates the lens rims of an eye-glass frame, which for purposes of illustration, is shown in the folding form commonly known as the Oxford type, in which said rims are spaced apart and connected together by a spring bridge 11. The rims 10 are illustrated as discontinuous, i. e. each of these rims is formed with separable meeting ends, provided with joint means for securing said ends together when the rim has been assembled around and in holding relation to the periphery of a lens 12. In the form of the invention shown in the drawing, the rim joints are located at the points of connection of the nose guard 13 to the rims.

The ends of the spring bridge 11 are connected to the rims 10 by spring biased hinge joints employing the novel housed spring of this invention. Each of these hinge joints consists of a chambered stationary hinge butt 14 fixedly attached to a portion of the rim 10 at the upper part of this rim.

The side walls of the hinge butt 14 are formed with perforate ears 16 and 16' for receiving a pivotal screw 17. The perforation of the ear 16 is illustrated as tapered at 18 for turnably receiving the tapered head of the pivotal screw 17, whereas the perforation of the ear 16' is cylindrical for turnably receiving the shank of this screw 17. Cooperating with the hinge butt 14 is a hinge yoke or knuckle 19 having perforate ears 20 and 20'. Ears 20 and 20' are positioned adjacent and exteriorly of ears 16 and 16' of the hinge butt so as to be pivotally engaged by the pivotal screw 17 when the latter is inserted through the thus assembled parts. The perforation of the ear 20 is beveled at 30 to accommodate the tapered head of screw 17, whereas the perforation of ear 20' is threaded for receiving the threaded shank of screw 17. Hinge yoke 19 possesses a tubular extension 21 within which is received and secured an end of the bridge 11.

The hinge butt or knuckle 14 is formed with a transverse shoulder 22 which is normally engaged by a cooperating transverse shoulder 23 formed on hinge yoke 19, thus providing stop means for determining the normal out-swung position of the rims 10 relative to the bridge 11, i. e. when the foldable eye-glass frame is arranged in open or unfolded condition ready for application to the wearer's nose and eyes, said rims being yieldably retained in such out-swung position by novel housed spring means. This housed spring means comprises a coil torsion spring 24 retained under tension within a cylindrical housing 25. The coil spring 24 extends around the pivotal screw 17 within the chambered hinge butt 14 and between the ears 16 and 16' thereof.

The coil spring 24 and its housing 25 are adapted to be assembled as a unit for removable insertion into the hinge butt 14. The cylindrical housing 25 is provided with a narrow indented niche or slot 26 at one end thereof, through which niche one end portion or arm 27 of the torsion spring 24 projects. The housing 25 is also provided with a relatively wide indented niche or slot 28 at the other end thereof through which the other end portion or arm 29 of the spring projects. The spring 24 is adapted to be wound under tension and inserted into the housing 25 wherein it is maintained under tension by the engagement of its respective terminal arms 27 and 29 with or in the respective niches or slots 26 and 28. This spring and housing assembly may then be readily and easily inserted into the chambered hinge butt 14. Thus, as illustrated in Fig. 4 the spring and its housing assembly is first inserted into the space between the ears 16 and 16' so that one spring end portion, for example, spring end portion 27, engages the inner surface of top wall 15 of said hinge butt. The hinge yoke 19 is then placed over the hinge butt 14 so that ears 20 and 20' become aligned with ears 16 and 16', with the other end portion 29 of spring 24 pressing against the top wall of hinge yoke 19. The hinge screw 17 is then inserted through the aligned apertures in the ears of the hinge butt and hinge yoke, the said screw being threaded into the threaded aperture of ear 20' of the hinge yoke.

With the parts thus assembled, the tension of spring 24 presses the outer wall 15 of the hinge butt outwardly so that shoulders 22 and 23 abut one another and each lens rim 10 is held in its out-swung position for use.

In use, the coil springs 24 cooperate with spring bridge 11 to hold the lens rims and lenses in their normal useful positions. When it is desired to collapse the eye-glasses, as when through using the same, the lens rims are folded inwardly toward one another in the usual manner, during which folding movement, the wide niche 28 of each spring housing enables the end portion 29 of the spring to turn with respect to housing 25 and the end portion 27, thereby permitting such inward folding movement of the lens rims. During this folding movement, the ears 16 and 16' of the hinge butt or knuckle 14 turn on the pivotal screw 17 which is fixed to the hinge yoke or knuckle 19.

In practice, the manufacturer will assemble the coil spring 24 within the housing 25 and deliver a plurality of these units to the jeweler or retail optician so that in the event it is desired to replace a broken spring 24, the jeweler can readily do so from his stock. Heretofore, when using coil springs alone without a housing, it has been necessary to return eye-glasses having broken springs to the factory, because it required a factory expert, and special tool equipment to assemble such loose springs under tension.

While I have above described the use of the novel housed spring in a hinge connection for joining a spring bridge to a lens rim, this has been done merely by way of illustration of one of the principal fields of usefulness which the novel housed spring is designed to serve. It will be understood therefore that the housed spring may similarly be employed in hinge connections operating to join other parts of an eye-glass frame. For example, self-closing temples of spectacle frames, which utilize a spring hinge functioning to yieldably urge the temple to closed position, may be equipped with the novel housed spring of this invention; and the housed spring may be used in any other connection, and in fields other than eye-glass frames.

As many changes could be made in the above described constructions and many apparently different embodiments of this invention could be made without departing from the scope thereof as defined in the following claims, it is intended that all matter contained in the above description or shown in the accompanying drawing shall be interpreted as illustrative and not in a limiting sense.

What is claimed is:—

1. In a folding eye-glass frame having a spring bridge and lens rims connected thereto; a hinge joint for connecting the spring bridge to a lens rim, said joint comprising a chambered hinge butt fixedly attached to the lens rim, a chambered hinge yoke fixedly attached to the end portion of the spring bridge, a pivot member for pivotally connecting said hinge butt to said hinge yoke, an initially tensioned spring contained within the hollow interiors of said hinge butt and hinge yoke in surrounding relation to said pivot member, said spring having its end portions engaging said hinge butt and said hinge yoke for urging the lens rim into its outswung useful position, and a spring housing contained within the chambered interior of said hinge butt and hinge yoke in surrounding relation to said spring, said spring housing serving to constantly retain said spring under initial tension and having slots therein through which the spring end portions project, said spring and its housing being arranged for insertion as a unit into said hinge joint.

2. In a folding eye-glass frame having a spring bridge and lens rims connected thereto, a hinge joint for connecting the spring bridge to a lens rim, said joint comprising a chambered hinge butt fixedly attached to the lens rim, a chambered hinge yoke fixedly attached to the end portion of the spring bridge, said hinge butt and hinge yoke having cooperating apertured ears, a pivotal screw extending through said apertured ears for pivotally connecting said hinge butt and hinge yoke together, an initially tensioned coil torsion spring surrounding said pivotal screw, a cylindrical spring housing contained within the chambered interior of said hinge butt and hinge yoke and surrounding said torsion spring, said spring having end portions projecting externally of said housing and into engagement with said hinge butt and hinge yoke for urging said lens rim outwardly with respect to said spring bridge, means at the ends of said housing to engage said spring end portions for maintaining said spring under initial torsional tension, and said hinge butt and hinge yoke having cooperating abutting shoulders for determining the normal out-swung position of the lens rim with respect to the spring bridge.

3. In a folding eye-glass frame having a spring bridge and lens rims connected thereto; a hinge joint for connecting the spring bridge to a lens rim, said joint comprising, a hinge butt and a hinge yoke secured respectively to the lens rim and the spring bridge, a pivot member for pivotally connecting said hinge butt and hinge yoke together, and an assembled initially tensioned torsion spring and housing arranged to be removably mounted as a unit on said pivot member and entirely within said hinge butt and hinge yoke, said housing having notch means to retain said torsion spring under initial tension with the end portions of said spring respectively engaging said hinge butt and said hinge yoke for urging the lens rim into its out-moving useful position.

FRANK A. SHORT.